United States Patent
Birk (10) Patent No.: US 6,227,142 B1
(45) Date of Patent: May 8, 2001

(54) APPARATUS AND METHOD FOR RECOGNIZING AND DETERMINING THE POSITION OF A PART OF AN ANIMAL

(75) Inventor: Uzi Birk, Huddinge (SE)

(73) Assignee: Alfa Laval Agri, AB, Tumba (SE)

( * ) Notice: Subject to any disclaimer, the term of this patent is extended or adjusted under 35 U.S.C. 154(b) by 0 days.

(21) Appl. No.: 09/402,216

(22) PCT Filed: Dec. 19, 1997

(86) PCT No.: PCT/SE97/02194

§ 371 Date: Feb. 29, 2000

§ 102(e) Date: Feb. 29, 2000

(87) PCT Pub. No.: WO98/44782

PCT Pub. Date: Oct. 15, 1998

(30) Foreign Application Priority Data

Apr. 4, 1999 (SE) .................................................... 9701231

(51) Int. Cl.⁷ .............................. A01J 5/017; A01J 5/02; A01J 5/04
(52) U.S. Cl. ...................................... 119/14.08; 119/14.18
(58) Field of Search ............................. 119/14.01, 14.02, 119/14.03, 14.08, 14.1, 14.11, 14.13, 14.18

(56) References Cited

U.S. PATENT DOCUMENTS

| | | | |
|---|---|---|---|
| 4,223,635 | * | 9/1980 | Akerman ........................... 119/14.02 |
| 4,805,557 | * | 2/1989 | Van Der Lely et al. .......... 119/14.08 |
| 4,867,103 | | 9/1989 | Montalescot et al. . |
| 5,042,428 | * | 8/1991 | Van Der Lely et al. .......... 119/14.08 |
| 5,211,132 | * | 5/1993 | Farina et al. ......................... 119/664 |
| 5,379,721 | * | 1/1995 | Dessing et al. ................... 119/14.08 |
| 5,784,994 | * | 7/1998 | Van Der Lely et al. .......... 119/14.08 |
| 5,865,138 | * | 2/1999 | Van Der Lely et al. .......... 119/14.02 |
| 5,934,220 | * | 8/1999 | Hall et al. .......................... 119/14.08 |

FOREIGN PATENT DOCUMENTS

| | | |
|---|---|---|
| 4113700A1 | 10/1992 | (DE) . |
| 19548347A1 | 7/1997 | (DE) . |
| 0300115A1 | 10/1989 | (EP) . |
| 06473993A2 | 4/1995 | (EP) . |
| WO97/15900 | 5/1997 | (WO) . |

\* cited by examiner

*Primary Examiner*—Thomas Price
(74) *Attorney, Agent, or Firm*—Melvin I. Stoltz (57) ABSTRACT

The present invention relates to an apparatus and a method for recognizing and determining the position of a part of an animal. The apparatus comprises a source of structured light for illuminating a region expected to contain at least one part in such a way that an object illuminated by the light simultaneously or discrete in time is partitioned into at least two illuminated areas, where each two illuminated areas are separated by a not illuminated area, an image capture device arranged to capture at least one image formed by the light and provide an image signal, the apparatus further comprising image signal processing device to respond to the captured image signal and a control device to determine if the illuminated object is the part by comparing the image of the illuminated object to reference criteria defining different objects, and if the illuminated object is established to be the part of the animal, the position thereof is established, an animal related device and the device to guide the animal related device towards to the position of the part.

71 Claims, 7 Drawing Sheets

APPARATUS AND METHOD FOR RECOGNIZING AND DETERMINING THE POSITION OF A PART OF AN ANIMAL

TECHNICAL FIELD OF THE INVENTION

The present invention relates to an apparatus for recognising and determining the position of a part of an animal. The present invention also relates to a method for recognising and determining the position of a part of an animal.

DESCRIPTION OF RELATED ART

Over some twenty to thirty years numerous proposals have been made for techniques by which a milking apparatus, defined as including a teat cup connected to a milking machine, a teat cleaning device and a teat examination device, can be applied to a teat of a milk animal, such as a cow, by automatic means so as to avoid the need for attendance by an operator during the procedure of milking an animal.

As automatic techniques for the rest of the milking procedure have been available for some time, automation of the teat-cup application stage has become the main obstacle to the development of a fully-automatic milking procedure which does not require continuous attendance and enables the so-called "milking on demand" regime.

For many reasons, e.g. animal safety and comfort, milk hygiene and economic efficiency, the application stage has to be extremely reliable. That is a teat-cup must be quickly and correctly applied to a teat on every occasion when an animal presents for milking. Also, the equipment for carry out the application stage has to work in difficult conditions and must to be durable while not being too expensive.

EP-A-306 579 discloses a combination of a general sensor and local sensor to guide a teat cup onto a teat. The general sensor is mounted alongside the stall and projects a sheet of light derived from a laser towards the region where the udder and teats of an animal in the stall for milking will be present. The sheet of light is incident on an udder and teats when present and produces lines of light on the udder and teats. The sheet of light can be swept through the region to an appropriate position. A camera is mounted as part of the sensor and forms an image of the lines. The image includes discontinuous lines for the teats where illuminated by the sheet of light. These lines are analysed in a control arrangement so as to find the position of the teat(s) and calculate coordinates by triangulation for two horizontal axis and vertical axis. Reference values for the coordinates stored in the control arrangement assist in analysis by limiting the search and calculating time. The calculated coordinates are used to bring the local sensors in range of a teat. Knowledge of the reference coordinates may be used to limit the image analysis to the part of the image where the teats are expected to be found, thereby reducing the calculation time.

EP-A2-647 393 discloses an implement for milking an animal, such as a cow. The implement includes a robot arm able to carry teat cups, a laser transmitter element and a receiver element. The receiver element includes a diode detector, which supplies a signal determined by three parameters: the distance d from the sensor means to the object, and the angles $\alpha_1$ and $\alpha_2$ which indicate the initial angle and the final angle, respectively, of the laser beam moving across the object. This implement makes use of a conventional animal recognition data source for identifying the animal when it arrives in the milking parlour. The animal recognition is of importance to this implement to the extent that thereby is known for each animal the position of the teats of the animal's udder relative to a fixed point on the animal.

The first disclosure (EP-A 306 579) has the disadvantage that two sensors are needed and that one has to be mounted alongside the stall in an exposed position.

The disclosures mentioned above all require the use of what is called historical data about the animals, i.e. where the teats are positioned on the udder at a previous milking session. They also require the use of stalls for the animals to be placed in.

SUMMARY OF THE INVENTION

It is an object of the invention to provide an improved teat location technique for automatic milking procedures.

According to the invention there is provided an apparatus for recognising and determining the position of at least one part of an animal. The apparatus comprises a source of structured light for illuminating a region expected to contain said at least one part in such a way that an object illuminated by said light simultaneously or discrete in time is partitioned into at least two illuminated areas, where each two illuminated areas are separated by a not illuminated area. The apparatus also comprises an image capture means arranged to capture at least one image formed by said light and provide an image signal, an image signal processing means to respond to said captured image signals and a control means to determine if the illuminated object is said part by comparing the image of the illuminated object to reference criteria defining different objects, and if said illuminated object is established to be said part of the animal, the position thereof is established. The apparatus further comprises an animal related device and means to guide the animal related device towards the determined position of said part. The main advantage with the apparatus according to the present invention is that it does not require the use of what is called historical data about the animals. The animals do not need to be placed in special stalls, i.e. they can walk around unobstructedly. Another advantage is that it is easy to distinguish between different parts of an animal.

Advantageously the source of structured light is a light emitting device, and each area of said at least two illuminated areas is in the form of a line or a dot and the number of lines or dots is such that the control means is allowed to identify the illuminated object. Hereby is achieved that the illuminated object will be easily identified.

According to another embodiment of the apparatus according to the present invention, the source of structured light is at least two light emitting devices, wherein each light emitting device gives rise to a light emitting beam, wherein each two consecutive light emitting beams are separated by an angle $\alpha$, and in that each area of said at least two illuminated areas is in the form of a line or a dot and the number of lines or dots is such that the control means is allowed to identify the illuminated object.

According to yet another embodiment of the apparatus according to the present invention, the source of structured light is at least two light emitting devices, wherein each light emitting device gives rise to a light emitting plane, wherein each two consecutive light emitting planes in a vertical plane are separated by an angle $\alpha$, and in that each area of said at least two illuminated areas is in the form of a line and the number of lines is such that the control means is allowed to identify the illuminated object.

Preferably, in a vertical plane, the lowermost light emitting beam or light emitting plane is positioned to pass a small distance d above the centre of the mouth of a supported teat cup.

Advantageously the number of light emitting beams or light emitting planes are two, and said angle, $\alpha$, is preferably 8° and said distance d is preferably 8.5 mm.

Preferably, the apparatus also comprises a support means provided for scanning movement of the light emitting beam.

According to a first embodiment of the apparatus according to the present invention, the light emitting beam performs a scanning movement in a substantially horizontal plane by means of said support means.

According to a second embodiment of the apparatus according to the present invention, the light emitting beam performs a scanning movement in a substantially vertical plane by means of said support means.

According to a third embodiment of the apparatus according to the present invention, the light emitting beam performs a scanning movement in a substantially inclining plane by means of said support means.

According to a fourth embodiment of the apparatus according to the present invention, the support means is moved mainly in a zigzag pattern.

The scanning plane(s) or the light emitting planes is/are moved stepwise in such a way that a distance between two consecutive scanning planes or light emitting planes is greater than the width of the light emitting beam. Hereby, the providing of lines is achieved.

Preferably, the image signals obtained form different scanning planes or light emitting planes when illuminating an object gives rise to parallel lines in the complete image.

Advantageously the image signals obtained form different scanning planes or light emitting planes when illuminating an object gives rise to divergent lines in the complete image.

According to a third embodiment of the apparatus according to the present invention, the apparatus also comprises a screen with slits or a raster arranged in front of the light emitting device. Hereby lines are provided without moving parts, i.e. without scanning movement.

Preferably, the image signals obtained from the screen with slits or the raster when illuminating an object gives rise to a plurality of lines or divergent lines or a plurality of inclining lines in the image.

Advantageously, in another embodiment of the apparatus according to the present invention, the apparatus also comprises a screen, with a plurality of through holes arranged in a predetermined pattern, arranged in front of the light emitting device. Hereby, the provision of dots is achieved.

Preferably, the image signals obtained from the screen with through holes arranged in a predetermined pattern, when illuminating an object gives rise to a plurality of dots arranged in the image.

Preferably the image processing means process the different image signals to distinguish between relevant and not relevant lines or dots, whereby a relevant line is defined as a line with a length between 2 cm and 7 cm, and relevant dots are defined as dots arranged on an imaginary line with a length between 2 cm and 7 cm, to provided a complete image of illuminated objects, wherein the complete image is used by the control means for comparing the complete image to reference criteria defining different objects. The apparatus also comprises a filtering means to filter the image signals and eliminate not relevant lines or dots. Hereby, better quality in recognising and determining the position of a part of an animal is achieved.

Advantageously, the control means groups together said lines or dots into different groups in dependence of the position in a plane for each line or dot, and the length in said plane for each line or dots in said plane.

Preferably, the control means calculates a position for each group, which position is the mean value of the positions for each line or dot in said group, where each group represents an object. Hereby, the recognising and determining the position of the part searched for of an animal is achieved with better quality even if the animal is moving.

Preferably, the support means is moved in correspondence with the movement of said position for a group.

Advantageously, the animal related device is one of a teat milking cup, a teat cleaning device and a teat inspection device and the part is a teat of a milk animal.

The part can also be a rump of a milk animal.

The source of structured light is positioned to pass no lower than the mouth of a supported teat cup and the image capture means is a video camera arranged to view through the structured light and over the mouth of the cup.

Preferably, the video camera is a camera of the CCD type (Charged Coupled Device).

Advantageously, the image processing means includes means to select from the captured image signals a part including possible teat image signals and process only the selected part, thereby reducing the time between successive processings of the teat image signals.

Preferably, the image signal processing means provides in said captured image signals the position of a teat cup entry point for a selected teat.

Advantageously, the image signal processing means includes means to quantify the spatial separation represented by the selected part including possible teat image signals and the teat cup entry point signal and provide appropriate control information for said guide means.

Preferably, the control information causes more rapid movement of the guide means the greater said spatial separation. Hereby is achieved that the apparatus according to the present invention is working faster.

Advantageously, the support means comprises a robot arm and at least one light emitting device arranged on the robot arm.

According to another embodiment the support means comprises a robot arm, at least one light emitting device arranged on the robot arm, and a pivotal means by means of which the light emitting beam(s) performs a scanning movement.

Preferably, the number of lines are two.

Advantageously, the light emitting device is a laser emitting device.

According to another embodiment the light emitting device is an infrared light emitting device.

According to a further embodiment the light emitting device is a lamp and the apparatus also comprises a lens/lenses to diffract the light from the lamp.

According to yet a further embodiment each light emitting device is a laser emitting device and the apparatus also comprises a lens/lenses to diffract the laser emitting beam from each laser emitting device to a laser emitting plane, wherein the lowermost laser emitting plane is used to determine the position of the tip of said part.

Another object of the invention is to provide a method for recognising and determining the position of at least one part of an animal. The method comprises the following steps:

illuminating with structured light a region expected to contain said at least one part in such a way that an object illuminated by said light simultaneously or discrete in time is partitioned into at least two illuminated areas, where each two illuminated areas are separated by a not illuminated area, capturing at least one image formed by said light and provide an image signal, processing said image signals to determine if the illuminated object is said part by comparing the image of the illuminated object to reference criteria defining different objects, and if said illuminated object is established to be said part of the animal, the position thereof is established, and providing information for guiding an animal related device towards the determined position of said part. The main advantage with the method according to the present invention is that it does not require the use of what is called historical data about the animals. The animals do not need to be placed in special stalls, i.e. they can walk around unobstructedly. Another advantage is that it is easy to distinguish between different parts of an animal.

Advantageously, the method comprises the steps:

illuminating said object with a light emitting beam, wherein each area of said at least two illuminated areas is in the form of a line or a dot, and wherein the number of lines or dots is such that it allows for identifying the illuminated object. Hereby is achieved that the illuminated object will be easily identified.

According to another embodiment of the method according to the present invention, the method comprises the step:

illuminating said object with at least two light emitting beams, wherein each two consecutive light emitting beams in a vertical plane are separated by an angle $\alpha$, wherein each of said at least two illuminated areas is in the form of a line or a dot, and where the number of lines or dots is such that it allows for identifying the illuminated object.

According to yet another embodiment of the method according to the present invention, the method comprises the step:

illuminating said object with at least two light emitting planes, wherein each two consecutive light emitting planes in a vertical plane are separated by an angle $\alpha$, wherein each of said at least two illuminated areas is in the form of a line, and where the number of lines is such that it allows for identifying the illuminated object.

Preferably, the method also comprises the step:

passing a small distance d above the centre of the mouth of a supported teat cup with the lowermost, in a vertical plane, light emitting beam or light emitting plane.

Advantageously, the number of light emitting beams or light emitting planes are two.

Preferably, the method also comprises the step:

moving the light emitting beam to perform a movement mainly in a zigzag pattern.

Advantageously, the method also comprises the steps:

pivoting the light emitting beam to perform a scanning movement in a substantially horizontal plane, and during scanning moving the scanning plane upwardly from a position below the part to a position wherein the position of the part can be determined.

According to another embodiment of the method according to the present invention, the method comprises the step:

pivoting the light emitting beam to perform a scanning movement in a substantially vertical plane. The method also comprises the step:

moving the scanning plane(s) or light emitting planes step-wise in such a way that a distance between consecutive scanning planes or light emitting planes is greater than the width of the light emitting beam. Hereby, the providing of lines is achieved.

Preferably the method comprises the step:

obtaining image signals from different scanning planes or light emitting planes when illuminating an object giving rise to parallel lines or divergent lines in the complete image.

Advantageously, in a second embodiment of the method according to the present invention, the method also comprises the steps:

arranging a screen with slits or a raster in front of the light emitting beam, obtaining image signals when illuminating an object giving rise to a plurality of lines, or divergent lines, or a plurality of inclining lines in the image. Hereby another way to provide lines is achieved.

Preferably, the method comprises the steps:

arranging a screen with a plurality of through holes arranged in a predetermined pattern in front of the light emitting beam, obtaining image signals when illuminating an object giving rise to a plurality of dots arranged in the image. Hereby, the provision of dots is achieved.

Preferably, the method also comprises the steps:

processing the different image signals for distinguishing between relevant and not relevant lines or dots, whereby a relevant line is defined as a line with a length between 2 cm and 7 cm, and relevant dots are defined as dots arranged on an imaginary line with a length between 2 cm and 7 cm, for providing a complete image of illuminated objects, and filtering the image signals and eliminate not relevant lines or dots, wherein the complete image is used for comparing the complete image to reference criteria defining different objects. Hereby, better quality in recognising and determining the position of a part of an animal is achieved.

Advantageously, the method also comprises the step:

grouping together said lines or dots into different groups in dependence of position in a plane for each line or dot, and the length in said plane for each line or dots in said plane.

Preferably, the method also comprises the step:

calculating a position for each group, which position is the mean value of the positions for each line or dot in said group, where each group represents an object. Hereby, the recognising and determining the position of the part searched for of an animal is achieved with better quality even if the animal is moving.

Preferably, the method also comprises the step:

moving the light emitting beam or light emitting planes in dependence of the movement of said position for a group.

Advantageously, the method also comprises the steps:

selecting from the captured image signals a portion including possible part image signals, processing only the selected portion, providing in said captured image signals the position of a teat cup entry point for a selected teat, wherein the part is a teat, quantifying the spatial separation represented by the selected part including possible teat image signals and the teat cup entry point signal, providing said guidance information on the basis of the amount of said separation, and providing guidance information for faster movement the greater the separation. Hereby is achieved that the method according to the present invention is working faster.

Preferably, the method comprises the step:

capturing the image by viewing the region with a video camera.

Advantageously, the method also comprises the step:

directing the video camera along a view axis from below and through the structured light.

Preferably, the number of lines are two.

Advantageously, the method comprises the step:

illuminating said object with a laser emitting beam.

According to another embodiment, the method comprises the step:

illuminating said object with an infrared light beam.

According to a further embodiment, the method comprises the step:

illuminating said object with a lamp, whereby the light from the lamp is diffracted by a lens/lenses.

According to another embodiment, the method comprises the steps:

illuminating said object with at least two laser emitting beams, whereby each laser emitting beam is diffracted by a lens/lenses to a laser emitting plane, and using the lowermost, in a vertical plane, laser emitting plane to determine the position of the tip of said part.

The basis of the present invention is to "virtually paint" different objects with the aid of e.g. laser beams, so that the objects are illuminated at one or several moments, giving several e.g. horizontal laser-lines on the objects. With this technique it is easy to identify the outlines of different objects. These identified outlines of an object and reference criteria defining e.g. a teat are used to determine if the illuminated object is a teat. Then the position of an established teat is determined.

Embodiments of the invention will now be described with a reference to the accompanying drawings, in which.

BRIEF DESCRIPTION OF THE DRAWINGS

DETAILED DESCRIPTION OF EMBODIMENTS

Figure 1:
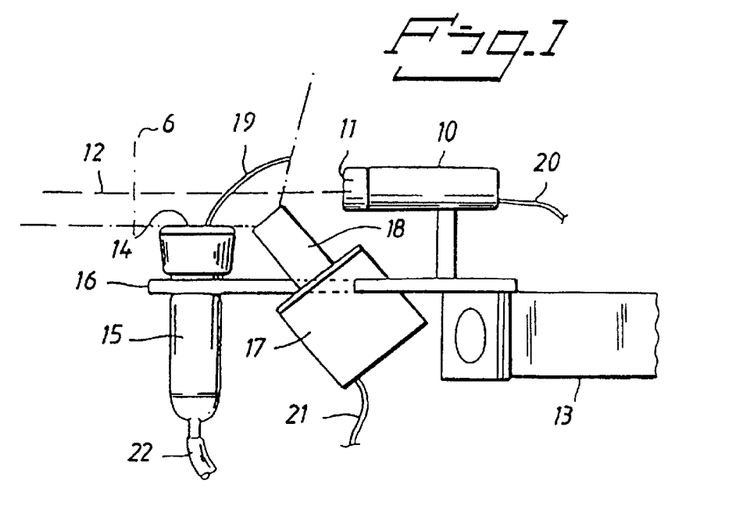
FIG. 1 shows a schematic diagram of an apparatus to form a teat-distinguishing image.

FIG. 1 shows a schematic diagram of an apparatus to form a teat-distinguishing image. The apparatus comprises a source 10 of structured light 12, in this example a small laser 10 such as a 5 milliwatt device from the firm Vector Technology, England, fitted with a lens 11 to provide a light sheet 12 of an included angle of some 60° to 80° with uniform illumination. Such a laser is a tube about 12 millimeters in diameter and 75 millimeters long with a fairly thin connection cable so it is not a severe additional load for a teatcup-carrier robot arm 13, even when mounted at the outer end of the robot arm 13. The laser 10 is positioned to direct the sheet of light 12 a small distance above the mouth 14 of a teat-cup 15 when in the carrier 16 of the robot arm 13. The carrier 16 of the robot arm 13 can also carry other different animal related devices, se e.g. FIGS. 5a, b and c.

An image capture means 17, e.g. a compact solid state camera 17 is also mounted on the animal-related-device-carrier 16. This camera 17 is a ½ inch (12 mm) charge coupled device camera (CCD-camera) fitted with a lens 18 to give a 100° angle of viewing 19 in the vertical plane. The camera 17 is positioned at an angle to the light sheet 12 so that one extreme of the angle of view is on or below e.g. the mouth 14 of the teat cup 15, and therefore below the light sheet 12, while the other extreme is directed to the rear of a perpendicular to the plane of the light sheet 12. This positioning of the camera view angle assists in distinguishing between objects at different distances from the camera 17.

Figure 2:
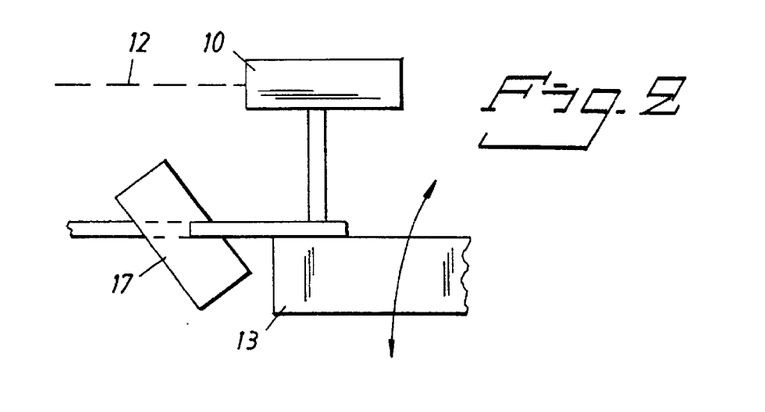
FIG. 2 shows a schematic diagram of a first way of performing scanning movement.
Figure 3:
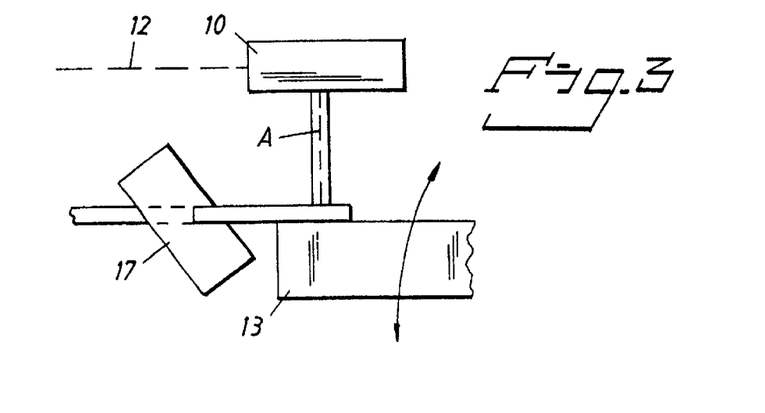
FIG. 3 shows a schematic diagram of a second way of performing scanning movement.

The apparatus also comprises a support means by means of which the light sheet 12 (in the form of a laser emitting beam) performs a scanning movement in a substantially horizontal plane. According to another embodiment of the apparatus of the present invention, the apparatus also comprises a support means by means of which the light sheet 12 (in the form of a laser emitting beam) performs a scanning movement in a substantially vertical plane. FIGS. 2 and 3 shows different ways of performing a scanning movement. In FIG. 2 there is disclosed the situation where the structured light 12 is in the form of a line or lines and wherein the scanning movement is performed by raising and lowering the robot arm 13 and consequently the source 10 of structured light 12, e.g. a laser emitting device. In FIG. 3 there is disclosed the situation where the structured light 12 is in the form of a dot shaped beam. The scanning movement is performed in two steps. First of all the laser emitting device 10 is turned around an axis A, which gives rise to a line, if the turning of the laser emitting device 10 is performed fast enough. Secondly, this line is made to perform a scanning movement by raising and lowering the robot arm 13 and consequently the laser emitting device 10.

In FIG. 1 there is also, with a dotted line, disclosed a screen 6 or a raster 6 arranged in front of the laser emitting device 10. The screen 6 can be provided with slits or a plurality of through holes (see FIGS. 6 and 7).

A connection to energise the laser 10 is indicated at 20, signal and energisation connections for the camera 17 at 21 and the vacuum line for the teat-cup 15 at 22. The robot arm 13 can be of the type shown in GB-PS 2,226,941 or GB-PS 2,258,382 or other suitable type. The control instructions for the robot arm are derived from the video camera information.

Figure 4:
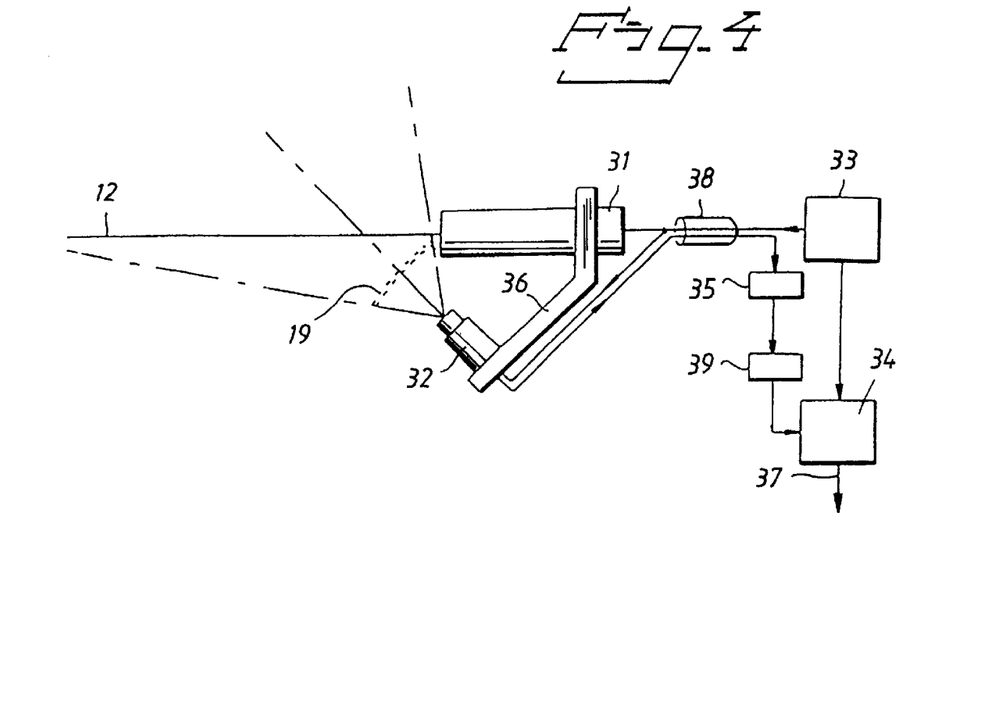
FIG. 4 shows a block diagram of image processing hardware, FIGS. 5a, b, c show different animal related devices used in connection with the apparatus according to the present invention.

FIG. 4 shows a block diagram of units of an image capture and processing arrangement. In FIG. 4 a laser stripe generator is indicated at 31 and a camera to view an image produced by the laser stripe is indicated at 32. Both are on the robot arm, part of which is shown at 36. A power supply unit 33 energises electronic circuit units 34 and 35 and camera 32, if needed. Unit 35 processes the image information from camera 32 and supplies image position information to unit 34 which provides control information to output 37 for the robot (not fully shown). Power and signal cables are held together 38 on the robot arm.

In FIG. 4 there is also disclosed a control means 39 arranged to determine if the illuminated object is e.g. a teat by the use of reference criteria defining e.g. a teat, wherein the image of the illuminated object is compared to reference criteria defining different parts of said animal.

Figure 5:
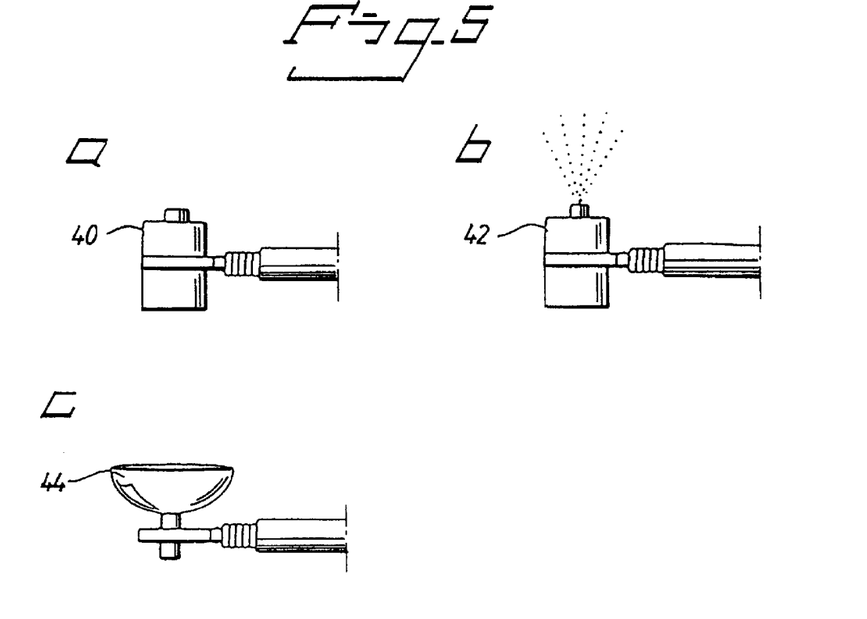

FIGS. 5a, b and c show different animal related devices used in connection with the apparatus according to the present invention. FIG. 5a shows a video camera 40 which can be used for inspecting injuries on the udder and/or the teats. FIG. 5b shows a spray device 42 for spraying of the udder and the teats, e.g. for cleaning of these. FIG. 5c shows a cup 44, which to a suitable level is filled with iodine in which the teats are dipped after finished milking.

The apparatus for recognising and determining the position of a part of an animal according to the present invention can also comprise a memory device (not shown) for storing different image signals. The memory device can e.g. be included in the image signal processing unit 35, which process the different image signals to distinguish between relevant and not relevant lines or dots, whereby a relevant line is defined as a line with a length between 2 cm and 7 cm, and relevant dots are defined as dots arranged on an imaginary line with a length between 2 cm and 7 cm to provide a complete image of illuminated objects. The apparatus further comprises a filtering means (not shown) to filter the image signals and eliminate not relevant lines or dots. The filtering means can e.g. also be included in the image signal processing unit 35 connected to and situated before the memory device. The apparatus can also be provided with pivotal means, by means of which the laser emitting beam performs a scanning movement in a substantially horizontal plane or a substantially vertical plane. The pivotal means can e.g. be constituted by a bidirectionally controllable stepper motor. The apparatus can also comprise a means for during scanning moving the scanning plane upwardly from a position below the teat to a position wherein the position of the teat can be determined. The scanning plane is moved stepwise in such a way that a distance between two consecutive scanning planes is greater than the width of the laser emitting beam.

Figure 6A:
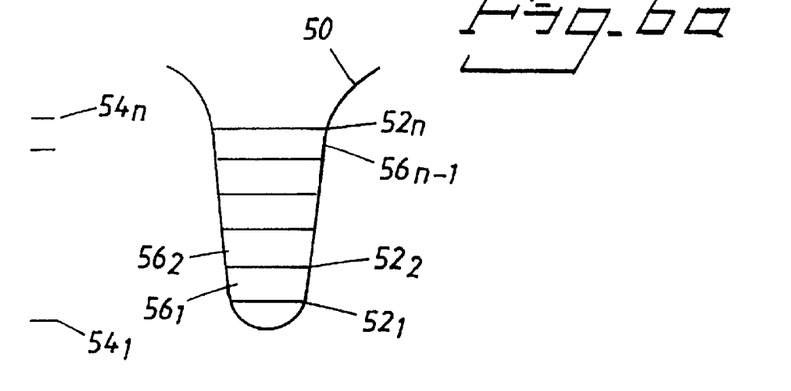
FIG. 6a, is a first example of the images captured by the camera.

FIG. 6a is a first example of the images captured by the camera 17; 32. FIG. 6a shows an example wherein the illuminated object is a teat 50. FIG. 6 shows the complete image after processing in the image signal processing means 35. In this case the apparatus according to the present invention comprises the pivotal means and the means for moving the scanning plane so that the laser emitting beam performs a scanning movement in a substantially horizontal plane. In the first scanning plane the laser emitting device 10; 31 illuminates the teat 50 with a first line $52_1$. The image signal of this line $52_1$ is captured by the camera 17: 32 and stored in the memory device. Then the scanning plane is moved upwardly and the laser emitting device 10; 31 illuminates the teat 50 with a second line $52_2$. The image signal of this second line $52_2$ is also captured by the camera 17; 32 and stored in the memory device. This process continues until the object can be identified, e.g. as a teat. In this case the teat 50 is illuminated with n lines, where $n \geq 2$. The image signals of the different lines $52_1, \ldots 52_n$ are stored in the memory device and "buffered" in the image signal processing means 35 to a complete image. The different image signals also comprises not relevant lines $54_1, \ldots 54_n$ due to e.g. disturbances. These not relevant lines $54_1, \ldots 54_n$ are eliminated by the filtering means so they are actually eliminated in the complete image. They are only showed in FIG. 4 to explain the process. In the complete image the different lines $52_1, \ldots 52_n$ are separated by not illuminated areas $56_1, \ldots 56_{n-1}$. The complete image will have a distinct contrast and the different objects can easily be identified by the control means 39, which uses reference criteria defining e.g. a teat to determine if the object is a teat. Then the image signal processing means 35 determines the position of the established teat.

In FIG. 6a, the teat 50 is illuminated with n lines, in this case at least 6 lines. However, experiments have proved that a sufficient result, i.e. the object can be identified, e.g. as a teat, can be achieved with only 2 lines. This situation and preferred embodiment is disclosed in FIG. 6b.

Figure 6B:
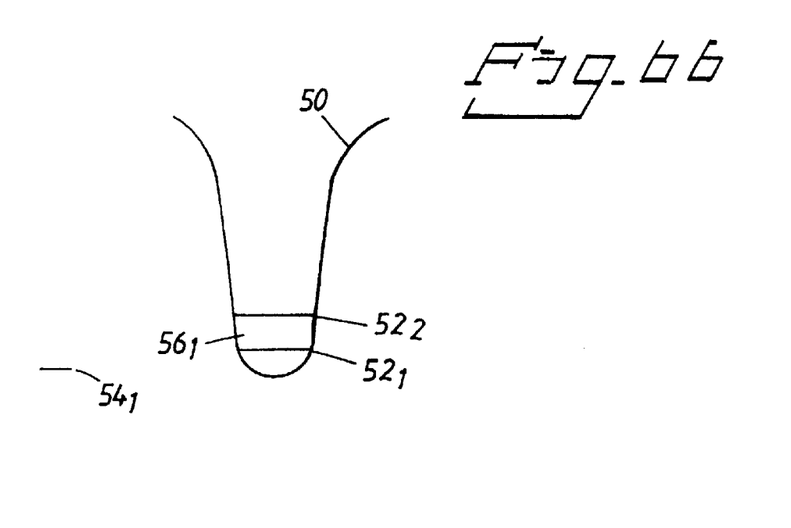
FIG. 6b, is an example of the images captured by the camera, where the number of lines are 2.

The complete image of FIG. 6a, or 6b can also be accomplished with an apparatus comprising a screen 6 with slits or a raster 6 arranged in front of the laser emitting device instead of the pivotal means. In these cases the laser emitting beam is not performing a scanning movement.

The lines $52_1, \ldots 52_n$ disclosed in FIGS. 6a, or 6b can also be divergent lines (not showed). This can be accomplished both with a screen with slits or a raster or with a pivotal means.

Figure 7:
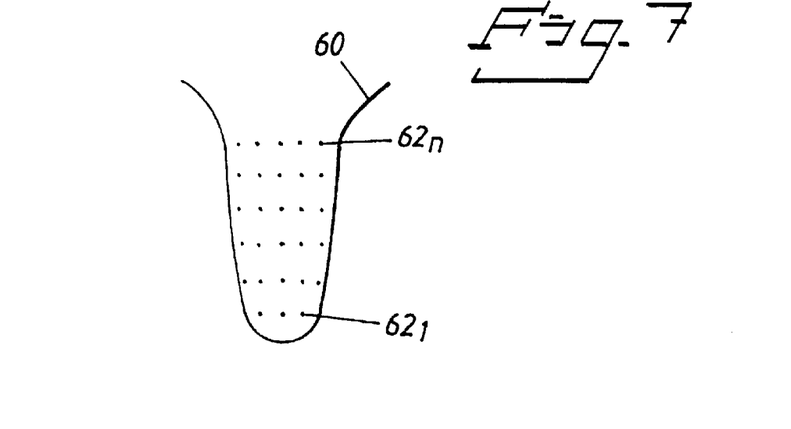
FIG. 7 is a second example of the images captured by the camera.

FIG. 7 is a second example of the images captured by the camera 17; 32. FIG. 7 shows an example wherein the illuminated object is a teat 60. FIG. 7 shows the complete image after processing in the image signal processing means 35. In this case the apparatus according to the present invention comprises a screen with a plurality of through holes arranged in a predetermined pattern, arranged in front of the laser emitting device 10; 31. When the teat 60 is illuminated with the laser emitting beam 12 it gives rise to a plurality of dots $62_1, \ldots 62_n$ arranged in the image.

The rest of the process is similar to the one described in connection with FIGS. 6a, and 6b.

Figure 8A:
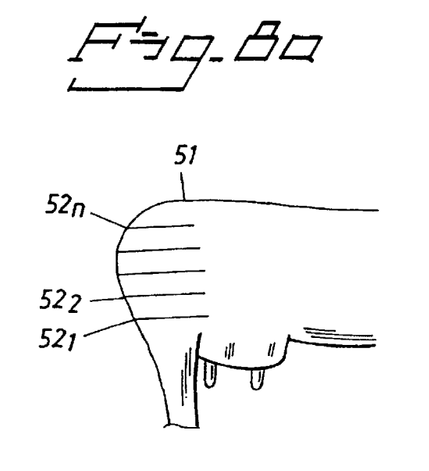
FIG. 8a, is a third example of the images captured by the camera.

FIG. 8a is a third example of the images captured by the camera 17; 32. FIG. 8a shows an example wherein the illuminated object is the rump 51 of a cow. FIG. 8a shows the complete image after processing in the image processing means 35. In this case the rump 51 of the cow is illuminated with n lines, where $n \geq 2$. The image signals of the different lines $52_1, \ldots, 52_n$ are stored in the memory device and "buffered" in the image signal processing means 35 to a complete image. In this case the reference criteria are longer lines than in the case in accordance with FIGS. 6a, and 6b. The rest of the process is similar to the one described in connection with FIGS. 6a and 6b.

Figure 8B:
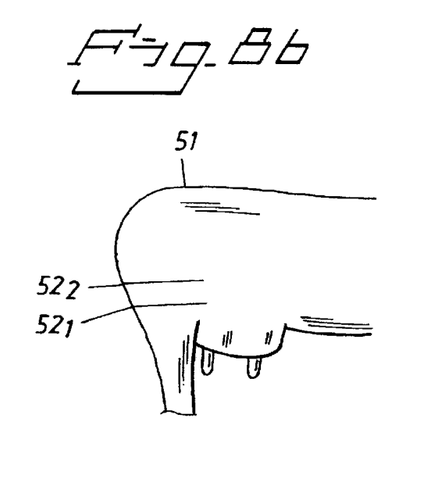
FIG. 8b, is an example of the images captured by the camera, where the number of lines are 2.

In FIG. 8b, there is disclosed the preferred embodiment where the number of lines are 2. Experiments have proved that a sufficient result can be achieved with only 2 lines, i.e. the object can be identified as a rump 51.

Figure 9:
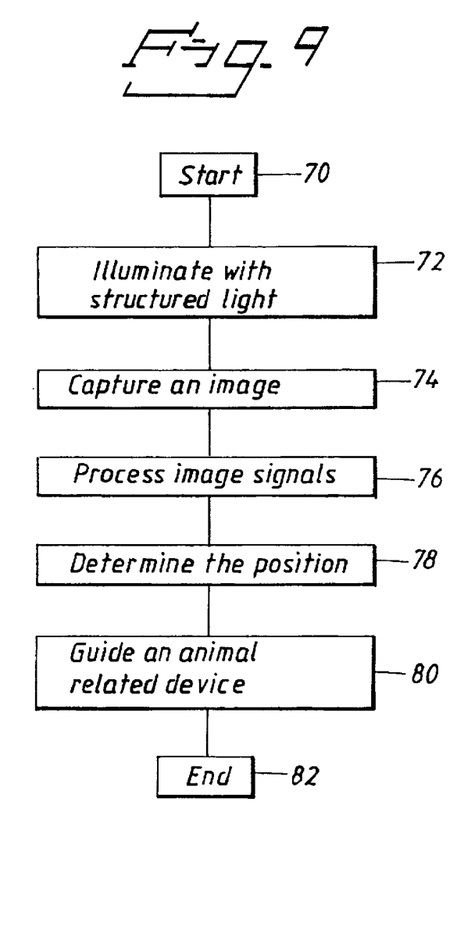
FIG. 9 is a flow chart of the method according to the present invention.

FIG. 9 is a flow chart of the method according to the present invention. The method begins at block 70. At block 72 the method continues with illuminating with structured light a region expected to contain at least one teat in such a way that an object illuminated by said light simultaneously or discrete in time is partitioned into at least two illuminated areas, where each two illuminated areas are separated by a not illuminated area. The expression area in the context when using a laser is hereby used to mean a well defined zone, with very distinct outlines. Dots and lines provided by a laser are quite distinct and well defined. The method continues at block 74 with capturing at least one image formed by said light and provide an image signal. The next step, at block 76, consists of processing said image signals to determine if the illuminated object is said part by the use of reference criteria defining e.g. a teat, wherein the image of the illuminated object is compared, by the control means 39, to reference criteria defining different objects and if said illuminated object is a part of the animal, the position thereof is established. The reference criteria can be stored in the image signal processing device 35. The method continues at block 78 with determining the position of an established part. The next step, at block 80, consists of providing information for guiding an animal related device towards the determined position of said part. The method is completed at block 82.

Figure 10:
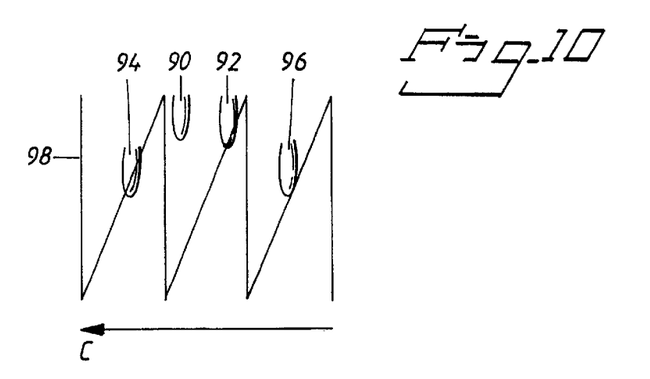
FIG. 10 shows a diagrammatic picture of the movement of the robot arm with the carrier.

FIG. 10 shows a diagrammatic picture of the movement of the robot arm with the carrier. In FIG. 10 there is disclosed four teats 90, 92, 94, 96 of a cow. The robot arm 13 (see FIG. 1) with the carrier 16, and consequently the laser emitting device 10 and the camera 17 are moving in a substantially zigzag pattern 98, in a direction from right to left in the picture, as indicated with the arrow C. At the same time as the robot arm 13 performs this zigzag movement, the laser emitting device 10 performs e.g. the scanning movement.

Figure 11:
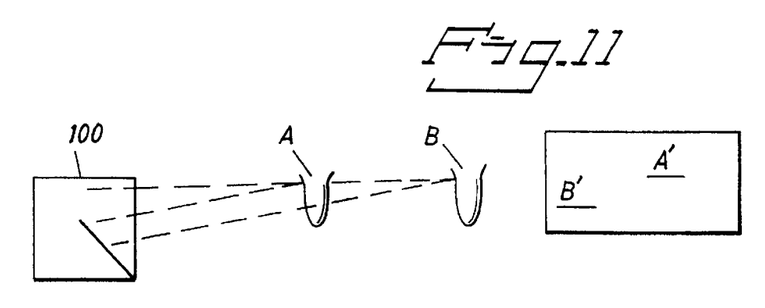
FIG. 11 shows a diagrammatic picture of the relation between the illuminated objects and the image captured by the camera.

FIG. 11 shows a diagrammatic picture of the relation between the illuminated objects and the image captured by the camera. 100 indicates the camera and the laser emitting device. In this case the laser emitting device 100 illuminates two teats A, B. The light is reflected back from the teats A, B to the camera 100, which is able to measure the positions of the lines A', B', (the right part of FIG. 11) and also the widths of the lines A', B'. As is apparent in FIG. 11 the line A' is situated above the line B' in the image 102 captured by the camera 100. This means that the teat A is nearer the camera 100 than the teat B. When the camera 100 captures an image, the image will contain a number of lines. Each line will have an x-, y-position and a length d. All these lines are grouped together, by means of the control means, into different groups in dependence of the position in a plane for each line, and the length in said plane for each line in said plane. A line which is close to an existing group is added to that group and the new position of the group is moved to a mean value position for the position of the added line and the old position of the group. The control means performs this calculation of the mean value position for each group, where each group represents an object. This calculation of a mean value position for each group means that the position for each group will be moving if e.g. the cow is moving. Each group has a range of tolerance in dependence of the searched part. All lines which are within this range of tolerance will be added to that group, while lines outside this range of tolerance will define a new group. If a line can belong to several groups, the line is added to the nearest group.

Figure 12:
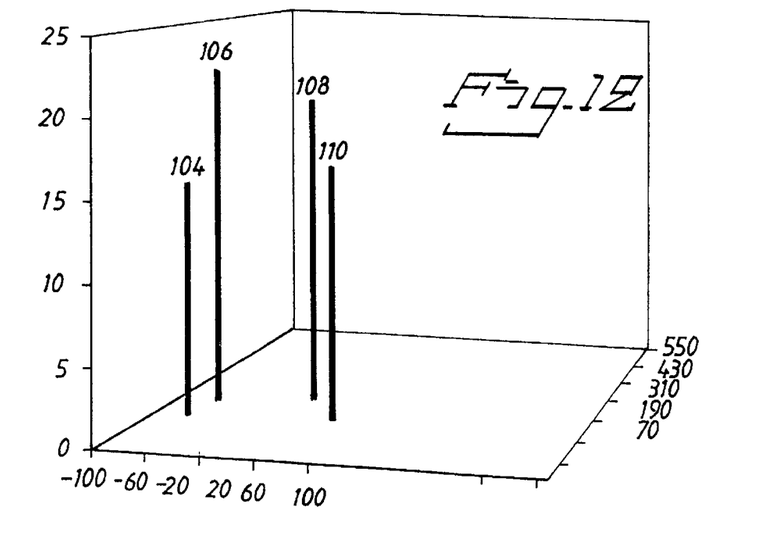
FIG. 12 is a diagram showing the positions of the identified teats of a cow.

FIG. 12 is a diagram showing the positions of the identified teats of a cow. In this diagram there is disclosed four different groups 104, 106, 108, 110 containing different number of lines. In this case each group represents a teat.

Figure 13:
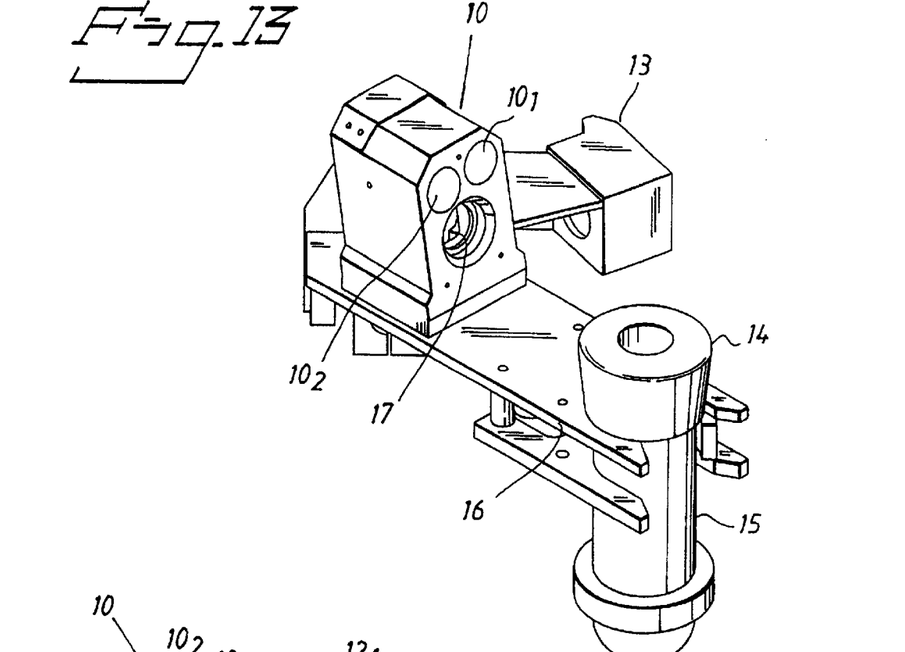
FIG. 13 shows a perspective view of a part of a second embodiment of an apparatus to form a teat-distinguishing image.

FIG. 13 shows a perspective view of a part of a second embodiment of an apparatus to form a teat-distinguishing image. The apparatus comprises a source 10 of structured light, in this example two small lasers $10_1$, $10_2$, each fitted with a lens/lenses to provide a light sheet or light plane (not shown) of an included angle of some 60° to 80° with uniform illumination. The apparatus also comprises a robot arm 13 for carrying the source 10 of structured light and a carrier 16 of the robot arm 13 to carry the teat cup 15 with the mouth 14 thereof. An image capture means 17, e.g. a compact solid state camera 17 is also mounted on the carrier 16, in this case in the same housing as the two lasers $10_1$, $10_2$. The two lasers $10_1$, $10_2$ are directing the light planes in slightly different directions (see FIG. 14).

Figure 14:
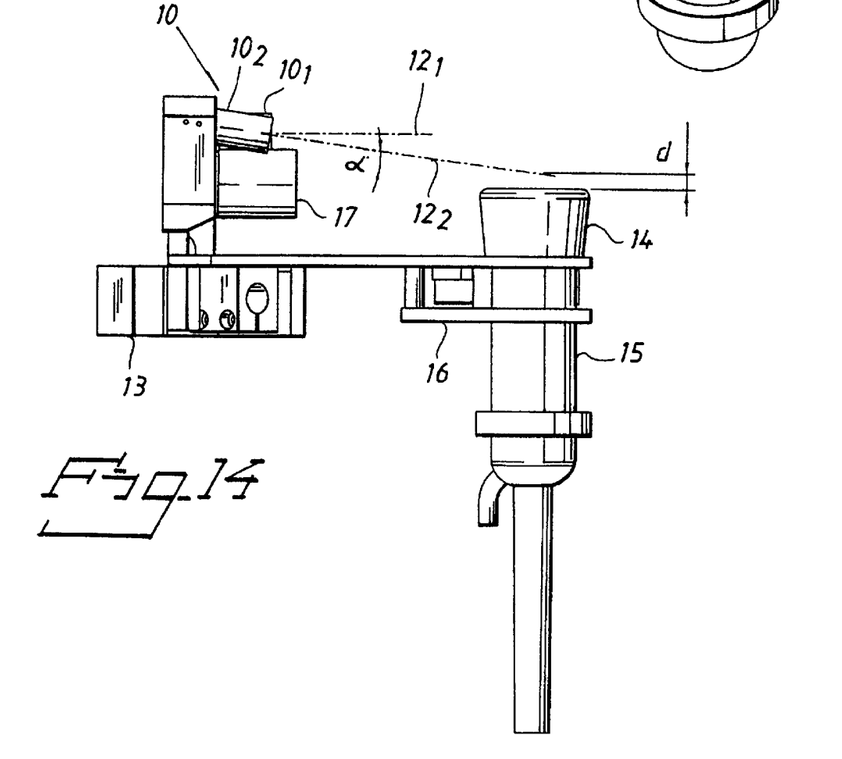
FIG. 14 shows a side view of the in FIG. 13 disclosed apparatus.

In FIG. 14 there is disclosed a side view of the in FIG. 13 disclosed apparatus. In this figure it is apparent that the first laser $10_1$ provides a first light plane $12_1$ and the second laser $10_2$ provides a second light plane $12_2$. In a vertical plane these two light planes $12_1$, $12_2$ are separated by an angle α. The second laser $10_2$ is positioned in such a way that the second light plane $12_2$ passes a small distance d above the mouth 14 of the teat cup 15. The values of α and d are determined by the geometry of the apparatus. One example of α is 8° and one example of d is 8.5 mm. This embodiment with this second light plane $12_2$ makes the positioning of the mouth 14 on the teat even faster and safer. It shall be pointed out that this embodiment is not limited to only two lasers. The apparatus can comprise N lasers, where N≧2, as long as the lowermost, in a vertical plane, light plane $12_n$ is positioned to pass a small distance d above the centre of the mouth 14. It is not necessary that each laser is provided with lens/lenses. $12_1$, $12_2$ discloses in this case laser beams and the apparatus comprises a support means by means of which the laser beams perform a scanning movement in a substantially horizontal plane. A further explanation will be given below in connection with FIGS. 15–17.

Figure 15:
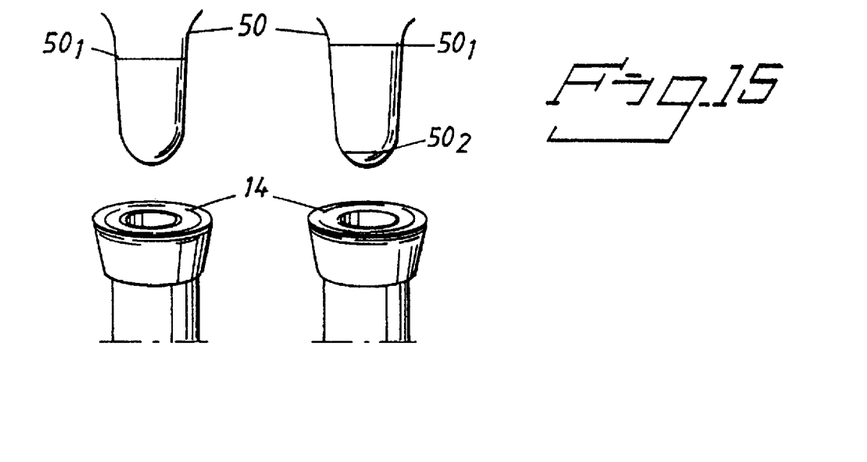
FIG. 15 shows a diagrammatic picture of the relation between the illuminated object and the mouth of a teat cup.

FIG. 15 shows a diagrammatic picture of the relation between the illuminated object and the mouth of a teat cup. In the leftmost situation the teat 50 is only illuminated by the first light plane $12_1$, giving rise to a line $50_1$. The apparatus has guided the mouth 14 of the teat cup to the disclosed position. This is described in connection with FIGS. 1–12 and will not be described again. In the rightmost situation the source 10 (see FIGS. 13 and 14) has moved upwards and the teat 50 is also illuminated by the second light plane $12_2$ giving rise to line $50_2$. This second line $50_2$ makes it easier to determine the exact position of the tip of the teat 50.

Figure 16:
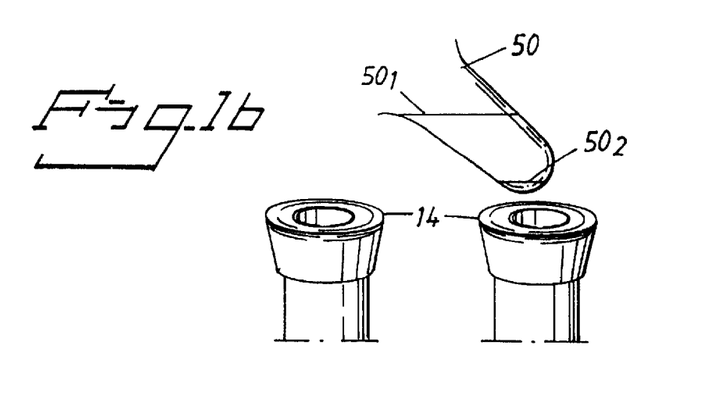
FIG. 16 shows a diagrammatic picture of the relation between the illuminated object and the mouth of a teat cup when the object is inclining.

FIG. 16 shows a diagrammatic picture of the relation between the illuminated object and the mouth of a teat cup when the object is inclining. As is apparent from this figure the teat 50 is inclining very much. If the teat 50 is only illuminated by the first light plane $12_1$ giving rise to a line $50_1$ the situation can be as in the leftmost position of the mouth 14 where it is guided away from the tip of the teat 50. If on the other hand the teat 50 is also illuminated by the second light plane $12_2$ giving rise to a second line $50_2$ the mouth 14 will be guided towards the tip of the teat 50, as is apparent in the rightmost position of the mouth.

Figure 17:
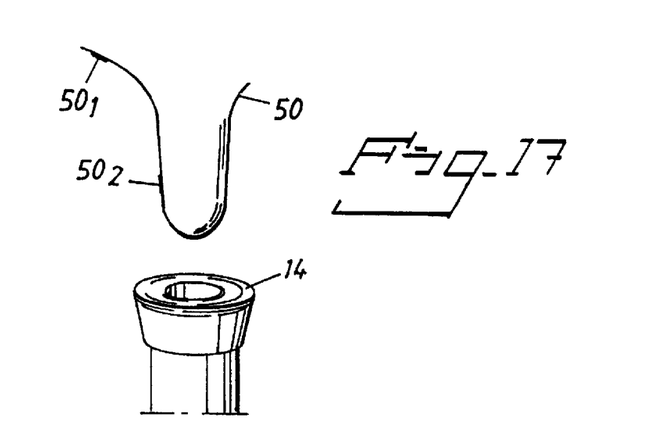
FIG. 17 shows a diagrammatic picture of the relation between the illuminated object and the mouth of a teat cup when using the apparatus disclosed in FIGS. 13 and 14.

FIG. 17 shows a diagrammatic picture of the relation between the illuminated object and the mouth of a teat cup when using the apparatus disclosed in FIGS. 13 and 14. In this figure the first light plane $12_1$ has moved upwards and gives rise to a first line $50_1$ positioned on the udder instead of on the teat 50. The first line $50_1$ has moved away from the tip of the teat 50. Due to the second line $50_2$ positioned on the teat 50 the mouth 14 will be guided and positioned as disclosed in the figure.

The structured light mentioned in the description has so far only been disclosed as laser light in the figures. The structured light can also be in the form of infrared light or manipulated light which has a certain shape, e.g. a line or dots. The manipulation can be comprised of that light will pass a combination of e.g. lenses and screens.

The invention is not limited to the embodiment described in the foregoing. It will be obvious that many different modifications are possible within the scope of the following claims. Furthermore, it should be noted that even though the described apparatus and method do not require the use of historical data of the animal, such use is not excluded, as it may enhance the performance of said apparatus and method.

What is claimed is:

1. An apparatus for recognising and determining the position of at least one part of an animal, wherein the apparatus comprises a source (10; 31) of structured light (12) for illuminating a region expected to contain said at least one part wherein an object illuminated by said light (12) simultaneously or discrete in time is partitioned into at least two illuminated areas ($52_1$, $52_2$, $62_1$, $62_2$) where each two illuminated areas ($52_1$, $52_2$, $62_1$, $62_2$) are separated by a not illuminated area ($56_1$), an image capture means (17; 32) arranged to capture at least one image and provide an image signal, the apparatus further comprising an image signal processing means (35) to respond to said captured image signal and a control means (39) to determine if the illuminated object is said part by comparing the image of the illuminated object to reference criteria defining different objects, and if said illuminated object is established to be said part of the animal, the position thereof is established, an animal related device (15; 40; 42; 44) and means to guide the animal related device (15; 40; 42; 44) towards the determined position of said part.

2. The apparatus defined by claim 1, wherein said at least one image captured by said image capture means (17; 32) is formed by said light (12).

3. The apparatus defined by claim 2, wherein the source (10; 31) of structured light (12) is a light emitting device (10; 31), and wherein each area of said at least two illuminated areas ($52_1$, $52_2$, $62_1$, $62_2$) is in the form of a line or a dot and the number of lines or dots is such that the control means is allowed to identify the illuminated object.

4. The apparatus defined by claim 3, wherein the apparatus also comprises a screen (6) with slits or a raster arranged in front of the light emitting device (10; 31).

5. The apparatus defined by claim 4, wherein the image signals obtained from the screen (6) with slits or the raster (6) when illuminating the object gives rise to plurality of lines ($52_1$, . . . $52_n$) in the image.

6. The apparatus defined by claim 4, wherein the image signals obtained from the screen with slits or the raster (6) when illuminating an object gives rise to divergent lines in the image.

7. The apparatus defined by claim 4, wherein the image signals obtained from the screen (6) with slits or the raster (6) illuminating an object gives rise to a plurality of inclining lines in the image.

8. The apparatus defined by claim 3, wherein the apparatus also comprises a screen (6) with a plurality of through holes arranged in a predetermined pattern, arranged in front of the light emitting device (10; 31).

9. The apparatus defined by claim 8, wherein the image signals obtained from the screen (6) with through holes arranged in a predetermined pattern, when illuminating an object gives rise to a plurality of dots ($62_1$ . . . , $62_n$) arranged in the image.

10. The apparatus defined by claim 3, wherein the image signal processing means (35) process the different image signals to distinguish between relevant and not relevant lines or dots, whereby a relevant line is defined as a line with a length between 2 cm and 7 cm, and relevant dots are defined as dots arranged on an imaginary line with a length between 2 cm and 7 cm, to provide a complete image of illuminated objects, wherein the complete image is used by the control means (39) for comparing the complete image to reference criteria defining different objects.

11. The apparatus defined by claim 10, wherein the apparatus also comprises a filtering means to filter the image signals and eliminate not relevant lines or dots.

12. The apparatus defined by claim 3, wherein the number of lines are two.

13. The apparatus defined by claim 3, wherein the light emitting (10; 31) is an infrared emitting device.

14. The apparatus defined by claim 3, wherein the light emitting device (10; 31) is a lamp, and wherein the apparatus also comprises a lens/lenses to diffract the light from the lamp.

15. The apparatus defined by claim 2, wherein said apparatus also comprises a support means provided for scanning movement of at least one light emitting beam.

16. The apparatus defined by claim 15, wherein the light emitting beam performs a scanning movement in a substantially horizontal plane by means of said support means.

17. The apparatus defined by claim 15, wherein the support means is moved mainly in a zigzag pattern.

18. The apparatus defined by claim 15, wherein said support means comprises a robot arm (13) and a light emitting device (10; 31) arranged on the robot arm (13).

19. The apparatus defined by claim 15, wherein said support means comprises a robot arm (13), a light emitting device (10; 31) arranged on the robot arm (13), and a pivotal means by means of which the laser emitting beam performs a scanning movement.

20. The apparatus defined by claim 2, wherein the light emitting device (10; 31) is a laser emitting device (10; 31).

21. The apparatus defined by claim 1, wherein the source of structured light (12) is at least two light emitting devices, wherein each light emitting device gives rise to a light emitting beam, wherein each two consecutive light emitting beams in a vertical plane are separated by an angle α, and in that each area of said at least two illuminated areas ($52_1$, $52_2$, $62_1$, $62_2$) is in the form of a line or a dot and the number of lines or dots is such that the control means is allowed to identify the illuminated object.

22. The apparatus defined by claim 21, wherein in a vertical plane, the lowermost light emitting beam or light emitting plane is positioned to pass a small distance d above the centre of the mouth (14) of a supported teat cup (15).

23. The apparatus defined by claim 22, wherein the number of light emitting beams or light emitting planes are two, and wherein said angle, α, is preferably 8° and said distance d is preferably 8.5 mm.

24. The apparatus defined by claim 23, wherein the light emitting beam performs a scanning movement in a substantially vertical plane by means of said support means.

25. The apparatus defined by claim 23, wherein the light emitting beam performs a scanning movement in a substantially inclining plane by means of said support means.

26. The apparatus defined by claim 1, wherein the source of structured light (12) is at least two light emitting devices, wherein each light emitting device gives rise to a light emitting plane, wherein each two consecutive light emitting planes in a vertical plane are separated by an angle α, and wherein each area of said at least two illuminated areas ($52_1$, $52_2$) is in the form of a line and the number of lines is such that the control means is allowed to identify the illuminated object.

27. The apparatus defined by claim 26, wherein the scanning plane(s) or the light emitting planes is/are moved step-wise in such a way that a distance between two consecutive scanning planes or light emitting planes is greater than the width of the light emitting beam.

28. The apparatus defined by claim 27, wherein the image signals obtained from different scanning planes when illuminating an object gives rise to parallel lines ($52_1, \ldots 52_2$) in the complete image.

29. The apparatus defined by claim 27, wherein the image signals obtained from different scanning planes or light emitting planes when illuminating an object gives rise to divergent lines in the complete image.

30. The apparatus defined by claim 26, wherein each light emitting device is a laser emitting device, and wherein the apparatus also comprises a lens/lenses to diffract the laser emitting beam from each laser emitting device to a laser emitting plane, wherein the lowermost laser emitting plane is used to determine the position of the tip of said part.

31. The method defined by claim 30, comprising illuminating said object with at least two light emitting planes, wherein each two consecutive light emitting planes in a vertical plane are separated by an angle α, wherein each said at least two illuminated areas is in the form of a line, and where the number of lines is such that it allows for identifying the illuminated object.

32. The method defined by claim 31, comprising moving the scanning plane(s) or light emitting planes step-wise in such a way that a distance between two consecutive scanning planes or light emitting planes is greater than the width of the light emitting beam.

33. The method defined by claim 32, comprising obtaining image signal from different scanning planes or light emitting planes when illuminating an object giving rise to parallel lines in the complete image.

34. The method defined by claim 32, comprising obtaining image signals from different scanning planes or light emitting planes when illuminating an object giving rise to divergent lines in the complete image.

35. The apparatus defined by claim 1, wherein the control means (39) groups together said lines or dots into different groups in dependence of the position in a plane for each line or dot, and the length in said plane for each line or dots in said plane.

36. The apparatus defined by claim 35, wherein the control means (39) calculates a position for each group, which position is the mean value of the positions for each line or dot in said group, where each group represents an object.

37. The apparatus defined by claim 35, wherein when said position for a group is moved, said support means is moved in correspondence therewith.

38. The apparatus defined by claim 1, wherein the part is a teat of a milk animal, and wherein the animal related device (15; 40; 42; 42) is one of a teat milking cup (15), a teat cleaning device (42) and a teat inspection device (40).

39. The apparatus defined by claim 38, wherein the image signal processing means (35) includes means to select from the captured image signals a part including possible teat image signals and process only the selected part, thereby reducing the time between successive processings of the teat image signals.

40. The apparatus defined by claim 39, wherein the image signal processing means (35) provides in said captured image signals the position of a teat cup (15) entry point for a selected teat.

41. The apparatus defined by claim 1, wherein the part is rump of a milk animal.

42. The apparatus defined by claim 1, wherein the source (10; 31) of structured light (12) is positioned to pass no lower than the mouth (14) of a supported teat cup (15) and the image capture means (17; 32) is a video camera (17; 32) arranged to view through the structured light (12) and over the mouth (14) of the cup (15).

43. The apparatus defined by claim 1, wherein the video camera (16; 32) is a camera of the CCD type (Charged Coupled Device).

44. The apparatus defined by claim 43, wherein the image signal processing means (35) includes means to quantify the spatial separation represented by the selected part including possible teat image signals and the teat cup entry point signal and provide appropriate control information for said guide means.

45. The apparatus defined by claim 44, wherein the control information causes more rapid movement of the guide means the greater said spatial separation.

46. A method for recognizing and determining the position of at least one part of an animal, which method comprises the following steps:
   A. illuminating with structured light a region expected to contain said at least one part in such a way that an object illuminated by said light simultaneously or discrete in time is partitioned into at least two illuminated areas, where each two illuminated areas are separated by a not illuminated area,
   B. capturing at least one image and provide an image signal,
   C. processing said image signals to determine if the illuminated object is said part by comparing the image of the illuminated object to reference criteria defining different objects, and if said illuminated object is established to be said part of the animal, the position thereof is established, and
   D. providing information for guiding an animal related device towards the determined position of said part.

47. The method defined by claim 46, comprising capturing at least one image formed by said light.

48. The method defined by claim 47, comprising illuminating said object with at least one light emitting beam, wherein each of said at least two illuminated areas is in the form of a line or a dot, and where the number of lines or dots is such that it allows for identifying the illuminated object.

49. The method defined by claim 48, comprising moving the light emitting beam to perform a movement mainly in a zigzag pattern.

50. The method defined by claim 49, comprising pivoting the light emitting beam to perform a scanning movement in a substantially horizontal plane, and during scanning moving the scanning plane upwardly from a position below the part to a position wherein the positions of the part can be determined.

51. The method defined by claim 49, comprising pivoting the light emitting beam to perform a scanning movement in a substantially vertical plane.

52. The method defined by claim 48, comprising arranging a screen with slits or a raster in front of the light emitting beam, obtaining image signals when illuminating an object giving rise to a plurality of lines in the image, or obtaining image signals when illuminating an object giving rise to divergent lines in the image, or obtaining image signals when illuminating an object giving rise to a plurality of lines, inclining lines in the image.

53. The method defined by claim 52, comprising processing the different image signals for distinguishing between relevant and not relevant lines or dots, whereby a relevant line is defined as a line with a length between 2 cm and 7 cm, and relevant dots are defined as dots arranged on an imaginary line with a length between 2 cm and 7 cm, for providing a complete image of illuminated objects, and filtering the image signals and eliminate not relevant lines or dots, wherein the complete image is used for comparing the complete image to reference criteria defining different objects.

54. The method defined by claim 53, comprising grouping together said lines or dots into different groups in dependence of the position in a plane for each line or dot, and the length in said plane for each line or dots in said plane.

55. The method defined by claim 54, comprising calculating a position for each group, which position is the mean value of the positions for each line or dot in said group, where each group represents an object.

56. The method defined by claim 55, comprising moving the light emitting beam or light emitting planes in dependence of the movement of said position for a group.

57. The method defined by claim 48, comprising arranging a screen with a plurality of through holes arranged in a predetermined pattern in front of the light emitting beam, obtaining image signals when illuminating an object giving rise to a plurality of dots arranged in the image.

58. The method defined by claim 48, wherein the number of lines are two.

59. The method defined by claim 48, comprising illuminating said object with a laser emitting beam.

60. The method defined by claim 48, comprising illuminating said object with an infrared light beam.

61. The method defined by claim 48, comprising illuminating said object with a lamp, whereby the light from the lamp is diffracted by a lens/lenses.

62. The method defined by claim 47, comprising illuminating said object with at least two light emitting beams, wherein each two consecutive light emitting beams in a vertical plane are separated by an angle $\alpha$, wherein each of said at least two illuminated areas is in the form of a line or a dot, and where the number of lines or dots is such that it allows for identifying the illuminated object.

63. The method defined by claim 62, comprising passing a small distance d above the centre of the mouth (14) of a teat cup (15) with the lowermost, in a vertical plane, light emitting beam or light emitting plane.

64. The method defined by claim 62, wherein the number of light emitting beams or light emitting planes are two.

65. The method defined by claim 62, comprising illuminating said object with at least two laser emitting beams, whereby each laser emitting beam is diffracted by a lens/lenses to a laser emitting plane, and using the lowermost, in a vertical plane, laser emitting plane to determine the position of the tip of said part.

66. The method defined by claim 47, comprising selecting from the captured image signals a portion including possible part image signals, and processing only the selected part.

67. The method defined by claim 66, comprising providing in said captured image signals the position of a teat cup entry point for a selected teat, wherein the part is a teat.

68. The method defined by claim 67, comprising quantifying the spatial separation represented by the selected part including possible teat image signals and the teat cup entry point signal, and providing said guidance information on the basis of the amount of said separation.

69. The method defined by claim 68, comprising providing guidance information for faster movement the greater the separation.

70. The method defined by claim 47, comprising capturing the image by viewing the region with a video camera.

71. The method according defined by claim 47, comprising directing the video camera along a view axis from below and through the structured light.

* * * * *